No. 647,801. Patented Apr. 17, 1900.
M. BRUNER.
VEHICLE AXLE.
(Application filed Mar. 6, 1900.)
(No Model.)
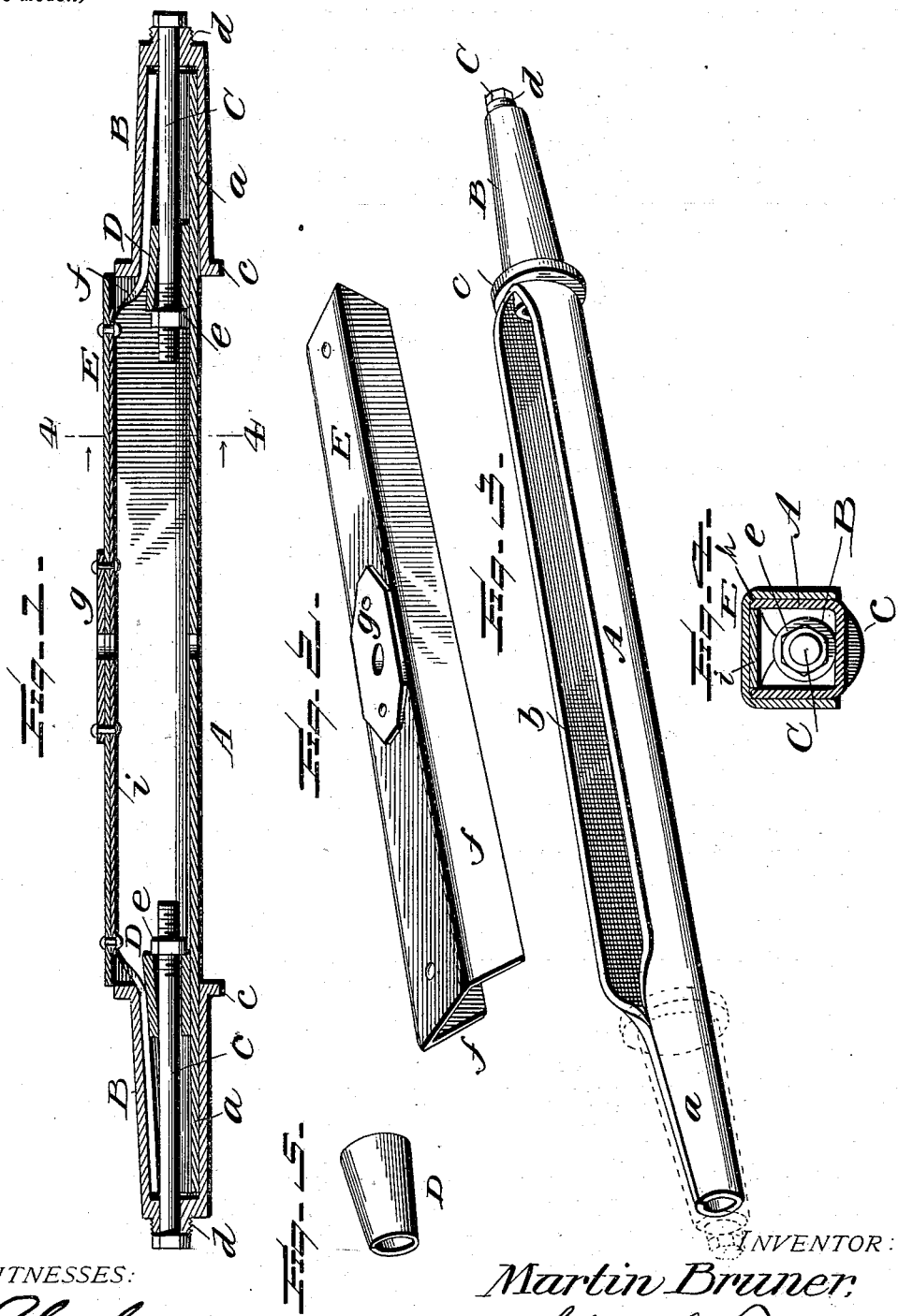
WITNESSES:
L. C. Hills
W. R. Taylor
INVENTOR:
Martin Bruner,
By Chas. H. Fowler,
Attorney

UNITED STATES PATENT OFFICE.

MARTIN BRUNER, OF BUCKLAND, OHIO.

VEHICLE-AXLE.

SPECIFICATION forming part of Letters Patent No. 647,801, dated April 17, 1900.

Application filed March 6, 1900. Serial No. 7,493. (No model.)

*To all whom it may concern:*

Be it known that I, MARTIN BRUNER, a citizen of the United States, residing at Buckland, in the county of Auglaize and State of Ohio, have invented certain new and useful Improvements in Vehicle-Axles; and I do hereby declare that the following is a full, clear, and exact description of the same, reference being had to the annexed drawings, making a part of this specification, and to the letters of reference marked thereon.

The present invention has for its object to provide an axle for all classes of vehicles constructed wholly of metal, which will possess strength, durability, and lightness compared with the metal axle of ordinary construction; and it consists in a metal axle constructed substantially as shown in the drawings and hereinafter described and claimed.

Figure 1 is a longitudinal section of an axle and its connecting parts which embody my invention; Fig. 2, a perspective view in detail of the flanged cap used to close the opening in the upper side of the axle; Fig. 3, a detail view in perspective of the axle proper, showing the skein in full lines and in dotted lines on the spindles at the respective ends of the axle; Fig. 4, a cross-section taken on line 4 4 of Fig. 1, and Fig. 5 a detail view in perspective of one of the frusto-conical tubular expanders.

In the accompanying drawings, A represents the axle, constructed of sheet metal of suitable thickness and bent in such shape as to form at its ends the tapering spindles $a$ and leaving the upper side open throughout the length of the body of the axle, as shown at $b$, for the purpose hereinafter described.

I do not wish to be understood as confining myself to any particular means of constructing the body of the axle, with its tapering spindles, as various modifications may be resorted to without departing from the essential features of the invention.

The meeting edges of the sheet metal which forms the tapering spindles $a$ are not secured together, thereby admitting of the spindle being expanded against the skeins B.

The skeins B are tapering to correspond with the taper of the spindles $a$, and at the inner end of the skein is an outwardly-extending circumferential flange $c$ and at the outer end a nipple $d$, which may be screw-threaded or not, as found desirable. A suitable bolt C of the required length extends through the axial center of the spindle and skein and is screw-threaded at its inner end to receive a suitable screw-threaded nut $e$. Before the nut is engaged with the screw-threaded end of the bolt a tubular expander D is slipped over the bolt and the nut screwed into place, as shown in Fig. 1 of the drawings. This tubular expander D is frusto-conical in shape, as shown in Fig. 5 of the drawings, and when in place upon the bolt C and the nut $e$ turned in the proper direction the expander will be forced forward or in a direction toward the outer end of the axle-spindle, which will bring the outer periphery of the expander in frictional contact with the interior of said spindle. By further turning of the nut $e$ the expander D will act as a wedge to spread out and increase the circumference of the spindle $a$ to force the same tightly against the skein B, thereby forming a tight connection between the spindle and skein and holding the latter in place thereon. After the skeins are in position on the axle-spindles and the frusto-conical tubular expanders, bolts, and nuts in place the opening or space $b$ in the upper side of the axle A is closed by a flanged cap E. This cap is constructed of sheet metal of suitable thickness and of a length to properly cover the opening $b$ in the axle, said cap having downwardly-extending flanges $f$, which extend over the sides of the axle as shown in Fig. 4 of the drawings.

The cap E upon its upper side is provided with a suitable friction-plate to prevent wear upon the cap and to strengthen the same at the point where it is connected to the running-gear of the vehicle. Upon the under side of the cap E are longitudinal grooves $h$, which are preferably formed by the rectangular plate $i$, suitably connected to the under side of the cap E.

The plate $i$ serves a twofold purpose—that is, it serves to reinforce the cap E and materially strengthen the same and being of less width than the interior width of the cap leaves sufficient space between the edges of the plate and the interior sides of the flanges $f$ to form the grooves $h$, which grooves form a seat for the edges of the side walls of the axle A. This cap E may be connected by any suitable means to the axle, so that it may be conveniently removed, if desired, or otherwise secured in place, as found most convenient.

The expansible axle-spindle is an essential feature of the invention, as well as the means for expanding the same, and I do not wish to be understood as limiting myself to the means shown for expanding the axle-spindles or the special construction of the cap E, as these several features are susceptible of many modifications or changes and still come within the scope of my invention.

The axle, with its several connections, may be constructed of steel, wrought-iron, or any other suitable metal found most preferable, and when it is desired to bring the wearing-surface of the skein B at a different point on its surface the skein may be turned upon its axis by first loosening the tubular expander and afterward tightening it to hold the skein in its adjusted position, thus compensating for wear upon the skein by changing the position of its bearing-surface, which is usually upon its under side.

Having now fully described my invention, what I claim as new, and desire to secure by Letters Patent, is—

1. A vehicle-axle provided with expansible spindles, substantially as and for the purpose set forth.

2. A vehicle-axle having split tubular spindles, suitable skeins fitting over the same, and means for expanding or enlarging the diameter of the spindles to hold the skeins in their adjusted position by frictional contact therewith, substantially as and for the purpose described.

3. A suitable vehicle-axle having expansible spindles, skeins upon the spindles, and frusto-conical tubular expanding devices for increasing the diameter of the spindles to force them against the interior surface of the skeins to hold them in their adjusted position by frictional contact therewith, substantially as and for the purpose specified.

4. A suitable vehicle-axle having expansible spindles, suitable skeins fitting over the spindles, and means for expanding or enlarging the circumference of the spindles, consisting of a frusto-conical tubular expanding device, and a screw-bolt and nut for operating the device, substantially as and for the purpose set forth.

5. A hollow metal vehicle-axle having tubular and expansible spindles, suitable skeins adjustable upon the spindles, and means for holding the skeins in their adjusted position, consisting of a frusto-conical tubular expanding device fitting in the tubular spindles and means for moving the device longitudinally therein, substantially as and for the purpose described.

6. A hollow metal axle having spindles integral therewith and the axle open at its upper side, and a rectangular metal cap having downwardly-extending side flanges, said cap adapted to fit over the axle to close the opening and provided upon its under side with a rectangular reinforce-plate of less width than the width of the cap to form the grooves or spaces for the edges or the side walls of the axle to fit in, substantially as and for the purpose specified.

7. A hollow metal vehicle-axle having expansible spindles and open at its upper side, and a suitable flanged cap adapted to fit over the axle to close the opening, substantially as and for the purpose set forth.

8. A hollow metal vehicle-axle having hollow expansible spindles and open at its upper side, a suitable flanged cap to fit over the axle to close the opening, adjustable skeins fitting over the spindles, and suitable means for expanding the spindles to hold the skeins in their adjusted position by frictional contact therewith, substantially as and for the purpose described.

9. A hollow metal vehicle-axle having hollow expansible spindles and open upon its upper side, a suitable flanged cap to fit over the axle to close the opening, suitable skeins fitting over the spindles and adjustable thereon, and means for expanding or enlarging the diameter of the spindles, consisting of a frusto-conical tubular expanding device adapted to fit in the hollow spindle, and a screw-bolt and nut for operating the expanding device, substantially as and for the purpose specified.

In testimony that I claim the above I have hereunto subscribed my name in the presence of two witnesses.

MARTIN BRUNER.

Witnesses:
P. J. WALSHE,
L. C. HILLS.